US011450022B2

(12) United States Patent
Micusik

(10) Patent No.: US 11,450,022 B2
(45) Date of Patent: *Sep. 20, 2022

(54) VOTING SPACE-BASED LOOP CLOSURE DETECTION

(71) Applicant: RPX Corporation, San Francisco, CA (US)

(72) Inventor: Branislav Micusik, Kierling (AT)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,093

(22) Filed: Oct. 27, 2020

(65) Prior Publication Data

US 2021/0110572 A1    Apr. 15, 2021

Related U.S. Application Data

(63) Continuation of application No. 16/114,759, filed on Aug. 28, 2018, now Pat. No. 10,861,186.

(51) Int. Cl.
*G06T 7/73*      (2017.01)
*G06T 19/00*     (2011.01)
*G06T 7/246*     (2017.01)

(52) U.S. Cl.
CPC ............... *G06T 7/73* (2017.01); *G06T 7/246* (2017.01); *G06T 19/006* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| | | |
|---|---|---|
| 10,861,186 B2 | 12/2020 | Micusik et al. |
| 2015/0077434 A1 | 3/2015 | Fukuchi et al. |
| 2016/0180590 A1 | 6/2016 | Kamhi et al. |
| 2017/0076499 A1 | 3/2017 | Jiang et al. |
| 2017/0357858 A1 | 12/2017 | Mendonca et al. |
| 2020/0074670 A1 | 3/2020 | Micusik |

OTHER PUBLICATIONS

Kim et al. (A two-step detection algorithm from the intersecting chords, Elsevier, 2000) (Year: 2000).*
"U.S. Appl. No. 16/114,759, Non Final Office Action dated Mar. 11, 2020", 14 pgs.

(Continued)

*Primary Examiner* — Kyle Zhai
(74) *Attorney, Agent, or Firm* — Schwegman Lundberg & Woessner, P.A.

(57) ABSTRACT

A method for detecting a loop closure is described. A device accesses pose information and a three-dimensional map of feature points generated by a visual inertia system of the device. The device splits the pose information into a translational part and a rotational part. The device limits the translational part to two-dimensional coordinates and estimates two-dimensional information of the limited translational part based on an accumulator voting space. The device determines an updated pose of the device based on the estimated two-dimensional information, the rotational part, and the three-dimensional map. The pose information is updated with the updated pose.

12 Claims, 10 Drawing Sheets

(56) References Cited

OTHER PUBLICATIONS

"U.S. Appl. No. 16/114,759, Response filed Jun. 11, 2020 to Non Final Office Action dated Mar. 11, 2020", 10 pgs.
"U.S. Appl. No. 16/114,759, Notice of Allowance dated Jul. 28, 2020", 8 pgs.
Hao, Qiang, "Efficient 2D-to-3D Correspondence Filtering for Scalable 3D Object Recognition", IEEE Conference on Computer Vision and Pattern Recognition (CVPR), (2013), 899-906.
Obdrzalek, Stepan, "A Voting Strategy for Visual Ego-Motion from Stereo", IEEE Intelligent Vehicles Symposium, San Diego, USA, (Jun. 21-24, 2010), 382-387.

* cited by examiner

VOTING SPACE-BASED LOOP CLOSURE DETECTION

PRIORITY APPLICATION

This application claims priority to U.S. patent application Ser. No. 16/114,759, filed Aug. 28, 2018, the disclosure of which is incorporated herein in its entirety by reference.

BACKGROUND

The subject matter disclosed herein generally relates to the processing of data. Specifically, the present disclosure addresses systems and methods for loop closure detection for drift-free visual odometry.

Augmented reality devices allow users to observe a scene while simultaneously seeing relevant virtual content that may be aligned to items, images, objects, or environments in the field of view of the device or user. However, the user may move the device relative to the items and stationary objects in space. The virtual content is therefore to be refreshed based on the new position of the device. The virtual content may be displayed incorrectly if the position of the augmented reality device in space is not tracked accurately.

In particular, when computing their location in space, the devices are subject to cumulative error which yields a positional drift.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
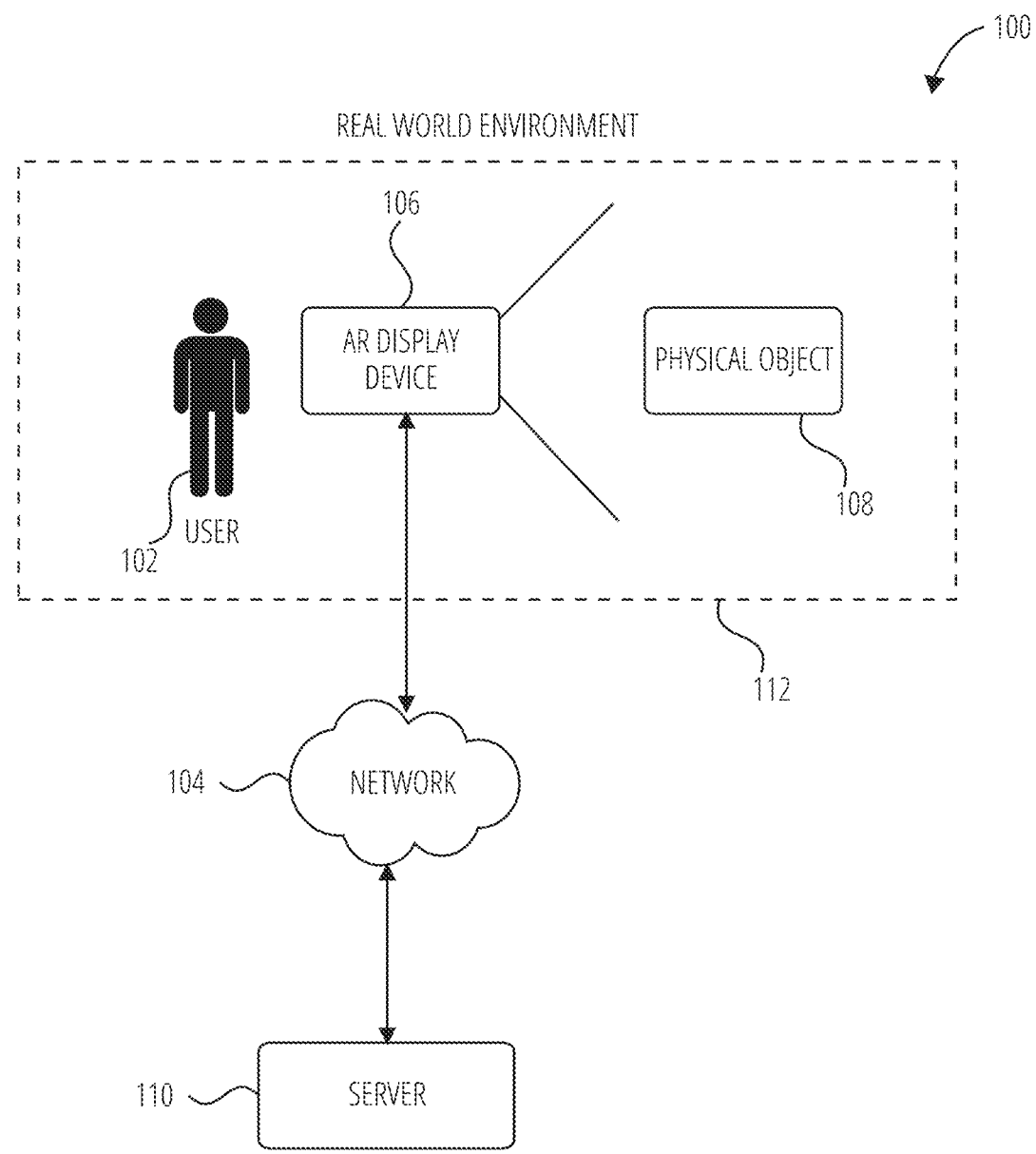
FIG. 1 illustrates a network environment for operating an AR display device in accordance with one example embodiment.

"Component" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

"Machine-Storage Medium" in this context refers to a single or multiple storage devices and/or media (e.g., a centralized or distributed database, and/or associated caches and servers) that store executable instructions, routines, and/or data. The term shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"Carrier Signal" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device.

"Signal Medium" in this context refers to any intangible medium that is capable of storing, encoding, or carrying instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Computer-Readable Medium" in this context refers to both machine-storage media and transmission media. Thus, the term includes both storage devices/media and carrier waves/modulated data signals. The terms "machine-readable medium," "computer-readable medium," and "device-readable medium" mean the same thing and may be used interchangeably in this disclosure.

DESCRIPTION

Example methods and systems are directed to detecting a loop closure to remedy drift of a visual odometry system of a device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional virtual object overlaid on an image of a physical object captured by a camera of an AR display device. A rendering of the three-dimensional virtual object may be based on a position of the AR display device relative to the physical object or relative to another frame of reference so that the virtual object appears aligned with the physical object as perceived by the user of the AR display device. For example, graphics (e.g., graphical elements containing instructions and guides) appear to be attached to a physical object of interest. In order to do this, the AR display device detects the physical object and tracks a pose of the AR display device and a pose of the object. A pose identifies a position and orientation of the object relative to a frame of reference or relative to another object.

When computing their location in space, the devices are subject to cumulative error which yields a positional drift. The drift can result in displaying virtual objects in mid-air or out of context with the real world. This destroys the illusion of the virtual objects co-existing in the real world with real-world physical objects. One solution to remedy positional drift is to detect previously visited places. One solution to remedy positional drift is to detect previously visited places. By utilizing visual similarity of images, the devices can correct their estimated poses and align their poses to the previous ones.

Conventionally, each image is searched for local feature points such as corners of intersecting edges. Those feature points are augmented with image descriptors. Image descriptors can include descriptions of the visual features of the contents in images. The descriptors are then later used for matching the current image to all the images seen from the time of starting the device. This solution results in poor performance because scenes can be viewed from different viewpoints with large depth variations, and because the scenes include repetitive textures, illumination irregularities, and reflective surfaces.

The present application describes a device that avoids using the image descriptors by limiting the space of possible locations of the camera to be estimated at a current time instant. As a result, the current image is linked to the three-dimensional (3D) map points that were seen and reconstructed in the past. This information helps reduce the drift in the further post-processing stage. In one example embodiment, the device relies on (a) the rotational part of the pose, (b) the height of the camera/device, and (c) the 3D coordinates of the tracked points in the current camera image. The presently described algorithm uses an accumulator voting space as an effective way to gather data necessary for correcting the estimated pose of the device.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR display device 106, according to some example embodiments. The network environment 100 includes the AR display device 106 and a server 110, communicatively coupled to each other via a network 104. The AR display device 106 and the server 110 may each be implemented in a computer system, in whole or in part, as described below with respect to FIG. 10.

The server 110 may be part of a network-based system. For example, the network-based system may be or include a cloud-based server system that provides additional information, such as three-dimensional models of virtual objects, to the AR display device 106.

FIG. 1 illustrates a user 102 using the AR display device 106. The user 102 may be a human user (e.g., a human being), a machine user (e.g., a computer configured by a software program to interact with the AR display device 106), or any suitable combination thereof (e.g., a human assisted by a machine or a machine supervised by a human). The user 102 is not part of the network environment 100, but is associated with the AR display device 106 and may be a user 102 of the AR display device 106. The AR display device 106 may be a computing device with a display, such as a smart phone, a tablet computer, or a wearable computing device (e.g., watch or glasses). The computing device may be hand-held or may be removably mounted to a head of the user 102. In one example, the display may be a screen that displays what is captured with a camera of the AR display device 106. In another example, the display of the device may be transparent, such as lenses of wearable computing glasses. In other examples, the display may be a transparent display such as a windshield of a car, plane, or truck. The display may be non-transparent and wearable by the user 102 to cover the field of vision of the user 102.

The user 102 may be a user of an application in the AR display device 106. The application may include an AR application configured to provide the user 102 with an experience triggered by a physical object 108, such as a two-dimensional physical object (e.g., a picture), a three-dimensional physical object (e.g., a statue), a location (e.g., a factory), or any references (e.g., perceived corners of walls or furniture) in the real-world physical environment. For example, the user 102 may point a camera of the AR display device 106 to capture an image of the physical object 108. The image is tracked and recognized locally in the AR display device 106 using a local context recognition dataset module of the AR application of the AR display device 106. The local context recognition dataset module may include a library of virtual objects associated with real-world physical objects or references. The AR application then generates additional information corresponding to the image (e.g., a three-dimensional model) and presents this additional information in a display of the AR display device 106 in response to identifying the recognized image. If the captured image is not recognized locally at the AR display device 106, the AR display device 106 downloads additional information (e.g., the three-dimensional model) corresponding to the captured image, from a database of the server 110 over the network 104.

The AR display device 106 tracks the pose (e.g., position and orientation) of the AR display device 106 relative to a real-world environment 112 using optical sensors (e.g., depth-enabled 3D camera, image camera), inertia sensors (e.g., gyroscope, accelerometer), wireless sensors (e.g., Bluetooth, Wi-Fi), Global Positioning System (GPS) sensors, and audio sensors to determine the location of the AR display device 106 within the real-world environment 112.

The computing resources of the server 110 may be used to detect and identify the physical object 108 based on sensor data (e.g., image and depth data) from the AR display device 106, and determine a pose of the AR display device 106 and the physical object 108 based on the sensor data. The server 110 can also generate a virtual object based on the pose of the AR display device 106 and the physical object 108. The server 110 can communicate the virtual object to the AR display device 106. The object recognition, tracking, and AR rendering can be performed on the AR display device 106, the server 110, or a combination of the AR display device 106 and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 6, 7, and 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 104 may be any network that enables communication between or among machines (e.g., the server 110), databases, and devices (e.g., the AR display device 106). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
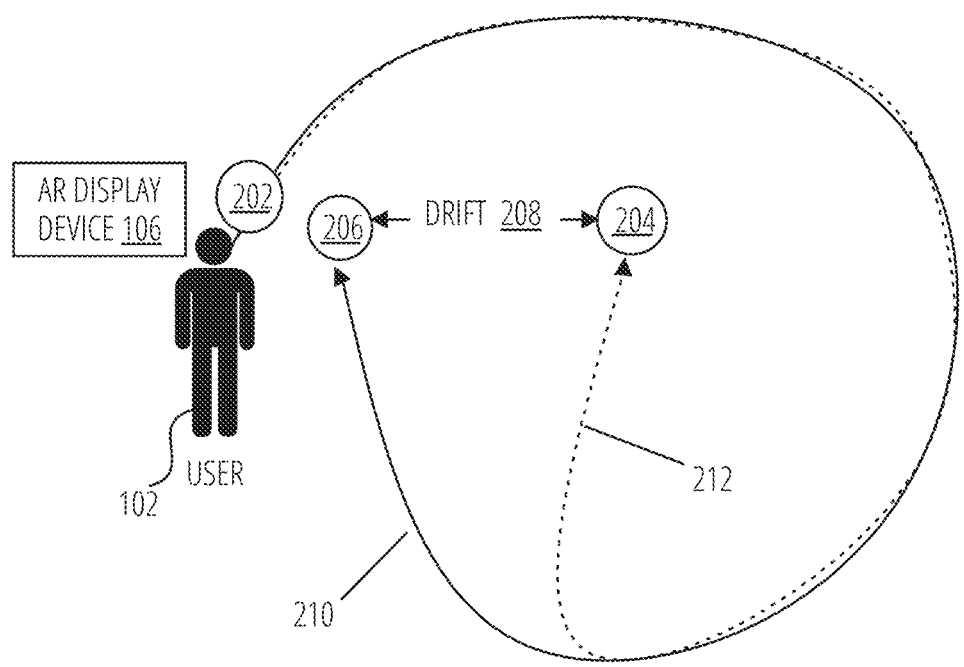
FIG. 2 illustrates an example of a drift of an AR display device.

FIG. 2 illustrates an example of a drift of the AR display device 106. The user 102 may wear or carry the AR display device 106. The user 102 starts operating the AR display device 106 at a starting point 202, and moves along an actual path 210 to end at an actual finish point 206. A visual odometry system of the AR display device 106 estimates a visual odometry path 212 and a visual odometry finish point 204. A drift 208 is measured between the actual finish point 206 and the visual odometry finish point 204. The AR display device 106 detects a closed loop at the actual finish point 206 and adjusts its visual odometry system to reset the drift 208.

Figure 3:
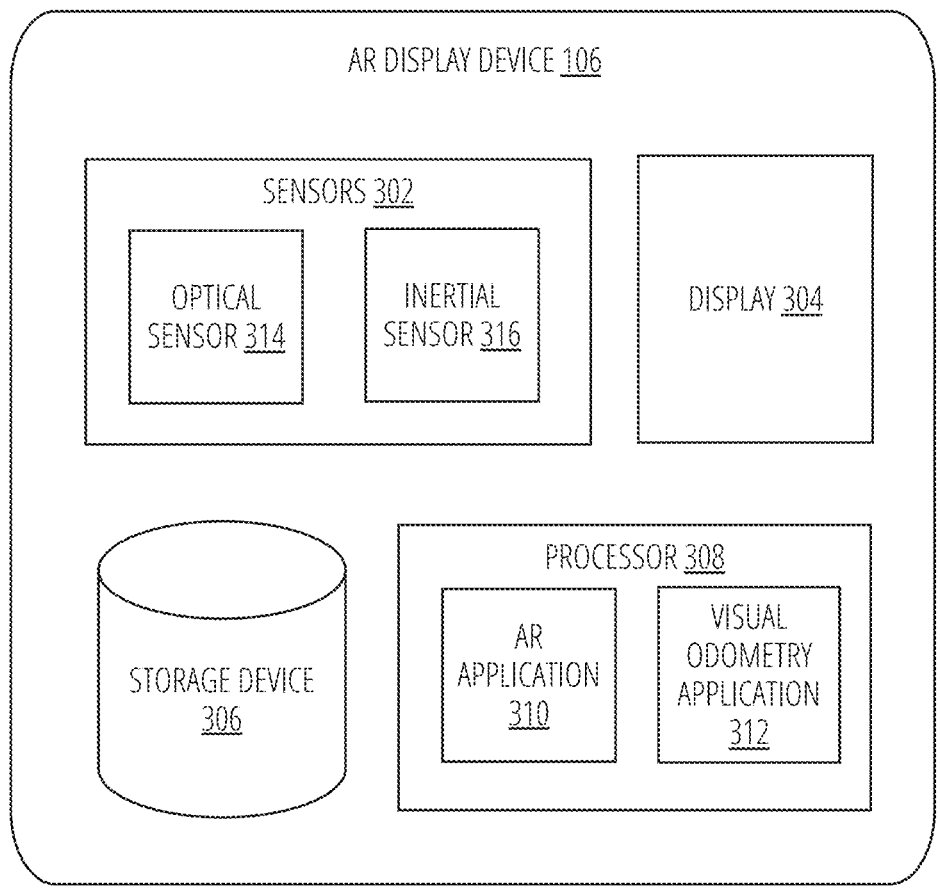
FIG. 3 illustrates an AR display device in accordance with one example embodiment.

FIG. 3 is a block diagram illustrating modules (e.g., components) of the AR display device 106, according to some example embodiments. The AR display device 106 includes sensors 302, a display 304, a processor 308, and a storage device 306. The AR display device 106 may be, for example, a wearable computing device, a desktop computer, a vehicle computer, a tablet computer, a navigational device, a portable media device, or a smart phone of the user 102.

The sensors 302 may include, for example, a proximity or location sensor (e.g., near field communication, GPS, Bluetooth, Wi-Fi), an optical sensor 314 (e.g., a camera such as a color camera, a thermal camera, a depth sensor, or one or multiple grayscale, global shutter tracking cameras), an inertial sensor 316 (e.g., a gyroscope, an accelerometer), an audio sensor (e.g., a microphone), or any suitable combination thereof. The optical sensor 314 may include a rear-facing camera and a front-facing camera in the AR display device 106. It is to be noted that the sensors 302 described herein are for illustration purposes and the sensors 302 are thus not limited to the ones described.

The display 304 includes, for example, a touch screen display configured to receive a user input via a contact on the touch screen display. In one example embodiment, the display 304 includes a screen or monitor configured to display images generated by the processor 308. In another example embodiment, the display 304 may be transparent or semi-opaque so that the user 102 can see through the display 304 (e.g., a head-up display).

The processor 308 includes an AR application 310 and a visual odometry application 312. The AR application 310 detects and identifies the physical object 108 using computer vision. The AR application 310 retrieves a virtual object based on the identified physical object 108 and renders the virtual object in the display 304. The AR application 310 includes a local rendering engine that generates a visualization of a three-dimensional virtual object overlaid on (e.g., superimposed upon, or otherwise displayed in tandem with) an image of the physical object 108 captured by the optical sensor 314. The visualization of the three-dimensional virtual object may be manipulated by adjusting a position of the physical object 108 (e.g., its physical location, orientation, or both) relative to the optical sensor 314. Similarly, the visualization of the three-dimensional virtual object may be manipulated by adjusting a pose of the AR display device 106 relative to the physical object 108.

In another example embodiment, the AR display device 106 includes a contextual local image recognition module (not shown) configured to determine whether the captured image matches an image locally stored in a local database of images and corresponding additional information (e.g., three-dimensional model and interactive features) on the AR display device 106. In one example embodiment, the contextual local image recognition module retrieves a primary content dataset from the server 110, and generates and updates a contextual content dataset based on an image captured with the AR display device 106.

The visual odometry application 312 estimates a pose of the AR display device 106. For example, the visual odometry application 312 uses image data and corresponding inertial data from the optical sensor 314 and the inertial sensor 316 to track a location and pose of the AR display device 106 relative to a frame of reference (e.g., the real-world environment 112). The visual odometry application 312 identifies a closed loop and adjusts/recalibrates its internal visual odometry system (e.g., optical sensor 314, inertial sensor 316). The visual odometry application 312 avoids using image descriptors by limiting the space of possible locations of the optical sensor 314 (for estimation) at a current instant. In one example embodiment, the visual odometry application 312 relies on (a) the rotational part of the pose, (b) the height of the optical sensor 314/AR display device 106, and (c) the 3D coordinates of the tracked points in the current camera image from the optical sensor 314. The visual odometry application 312 uses an accumulator voting space to gather data for correcting the pose of the AR display device 106.

The storage device 306 stores a 3D map of feature points generated by the visual odometry application 312, and sensor data generated by the sensors 302. In another example embodiment, the storage device 306 may be configured to store a database of visual references (e.g., images) and corresponding experiences (e.g., three-dimensional virtual objects, interactive features of the three-dimensional virtual objects). In one example embodiment, the storage device 306 includes a primary content dataset, a contextual content dataset. The primary content dataset includes, for example, a first set of images and corresponding experiences (e.g., interactions with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include images depicting the ten most viewed physical objects and their corresponding experiences (e.g., virtual objects that represent the ten most viewed physical objects). In another example, the server 110 may generate the first set of images based on the most popular or often-scanned images received at the server 110. Thus, the primary content dataset does not depend on physical objects or images scanned by the AR display device 106.

The contextual content dataset includes, for example, a second set of images and corresponding experiences (e.g., three-dimensional virtual object models) retrieved from the server 110. For example, images captured with the AR display device 106 that are not recognized (e.g., by the server 110) in the primary content dataset are submitted to the server 110 for recognition. If the captured image is recognized by the server 110, a corresponding experience may be downloaded at the AR display device 106 and stored in the contextual content dataset. Thus, the contextual content dataset relies on the context in which the AR display device 106 has been used. As such, the contextual content dataset depends on objects or images scanned by the AR display device 106.

In one example embodiment, the AR display device 106 may communicate over the network 104 with the server 110 to retrieve a portion of a database of visual references, corresponding three-dimensional virtual objects, and corresponding interactive features of the three-dimensional virtual objects.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
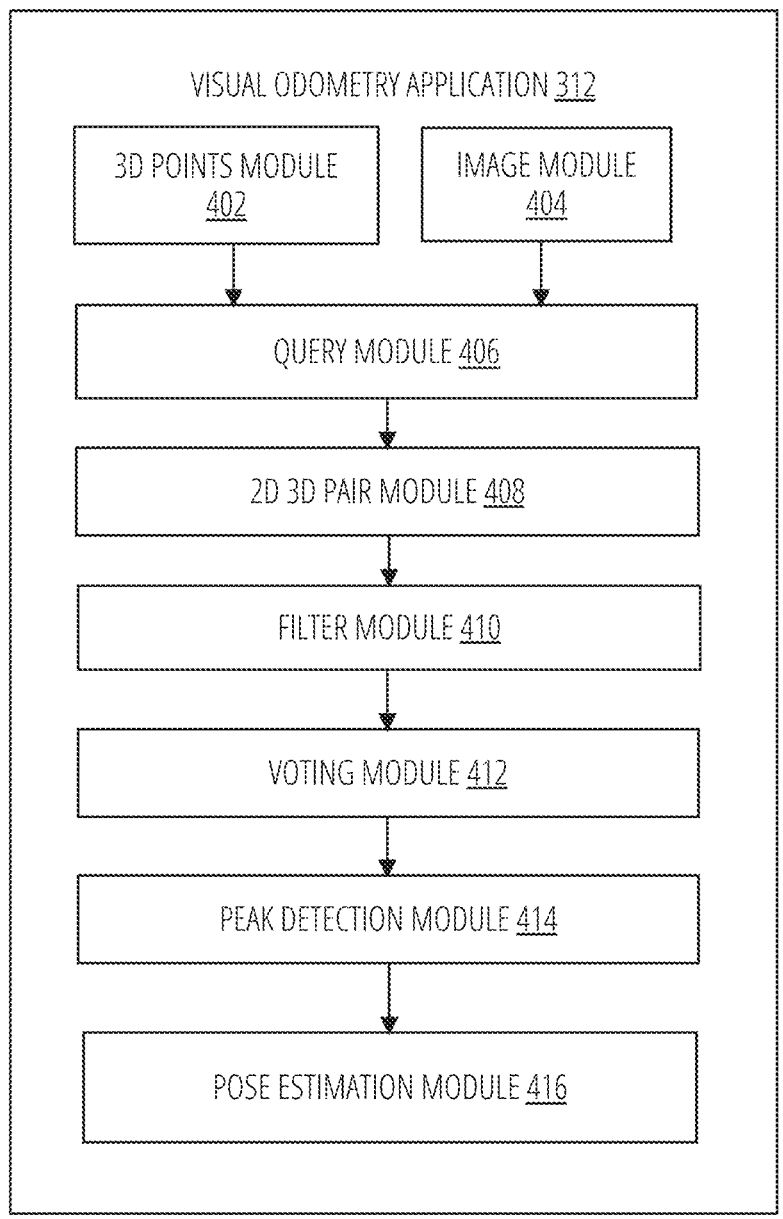
FIG. 4 illustrates a visual odometry application in accordance with one example embodiment.

FIG. 4 illustrates the visual odometry application 312 in accordance with one example embodiment. The visual odometry application 312 includes, for example, a 3D points module 402, an image module 404, a query module 406, a 2D 3D pair module 408, a filter module 410, a voting module 412, a peak detection module 414, and a pose estimation module 416. The 3D points module 402 accesses 3D feature points from a visual odometry system at the AR display device 106. In one example embodiment, the AR display device 106 includes a visual odometry system that estimates a pose of the AR display device 106 based on a 3D map of feature points from images captured with the optical sensor 314. The image module 404 accesses image data from the optical sensor 314. The query module 406 queries an image based on a current image from the visual odometry system with detected feature points using coordinates of the distinctive feature points, prior 3D feature points, and prior estimated poses from the visual odometry system of the AR display device 106. The 2D 3D pair module 408 forms 2D/3D pairs for the queried images. The filter module 410 filters pairs based on conditions such as (1) if the 3D feature point is behind the optical sensor 314, (2) if the 3D feature point has a very different depth from the prior 3D feature point, (3) if the 3D feature point was reconstructed from a very different vantage point than the current image, or (4) if the 3D feature point projects too far from the query image.

The voting module 412 calculates the x and y parts of the camera position in the real-world environment 112 and votes using a discretized voting accumulator (based on full prior poses and assuming known three degrees of freedom rotation and known height of the AR display device 106). The peak detection module 414 detects the dominant peak from the x and y parts. The pose estimation module 416 refines the final pose of the AR display device 106 based on the 2D/3D pairs that contribute to the dominant peak.

Figure 5:
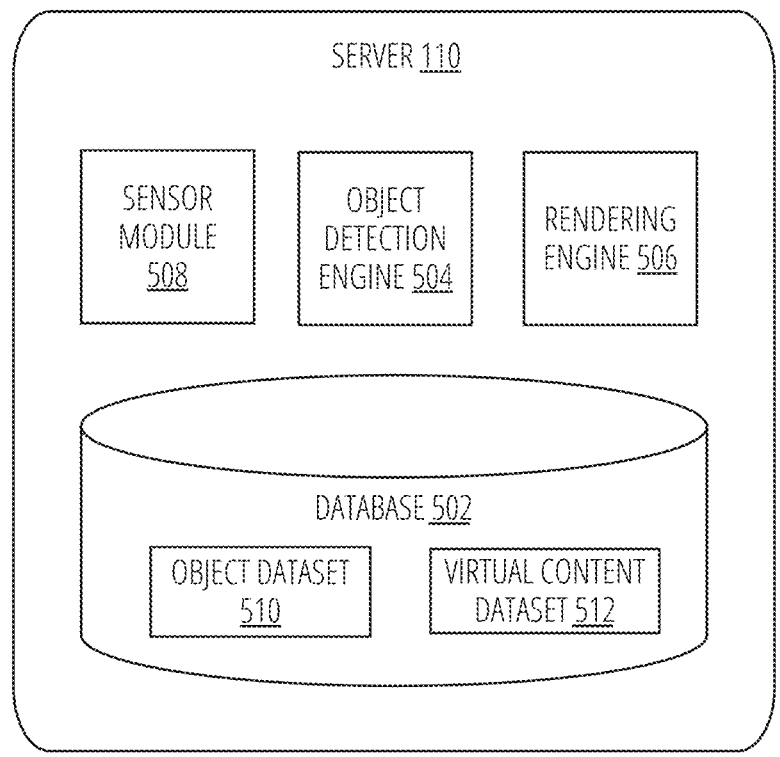
FIG. 5 illustrates a server in accordance with one example embodiment.

FIG. 5 is a block diagram illustrating modules (e.g., components) of the server 110. The server 110 includes a sensor module 508, an object detection engine 504, a rendering engine 506, and a database 502.

The sensor module 508 interfaces and communicates with the sensors 302 to obtain sensor data related to a pose (e.g., location and orientation) of the AR display device 106 relative to a first frame of reference (e.g., the room or real-world environment 112) and to one or more objects (e.g., the physical object 108).

The object detection engine 504 accesses the sensor data from the sensor module 508, to detect and identify the physical object 108 based on the sensor data. The rendering engine 506 generates virtual content that is displayed based on the pose of the AR display device 106 and the physical object 108.

The database 502 includes an object dataset 510, and a virtual content dataset 512. The object dataset 510 includes features of different physical objects. The virtual content dataset 512 includes virtual content associated with physical objects.

Figure 6:
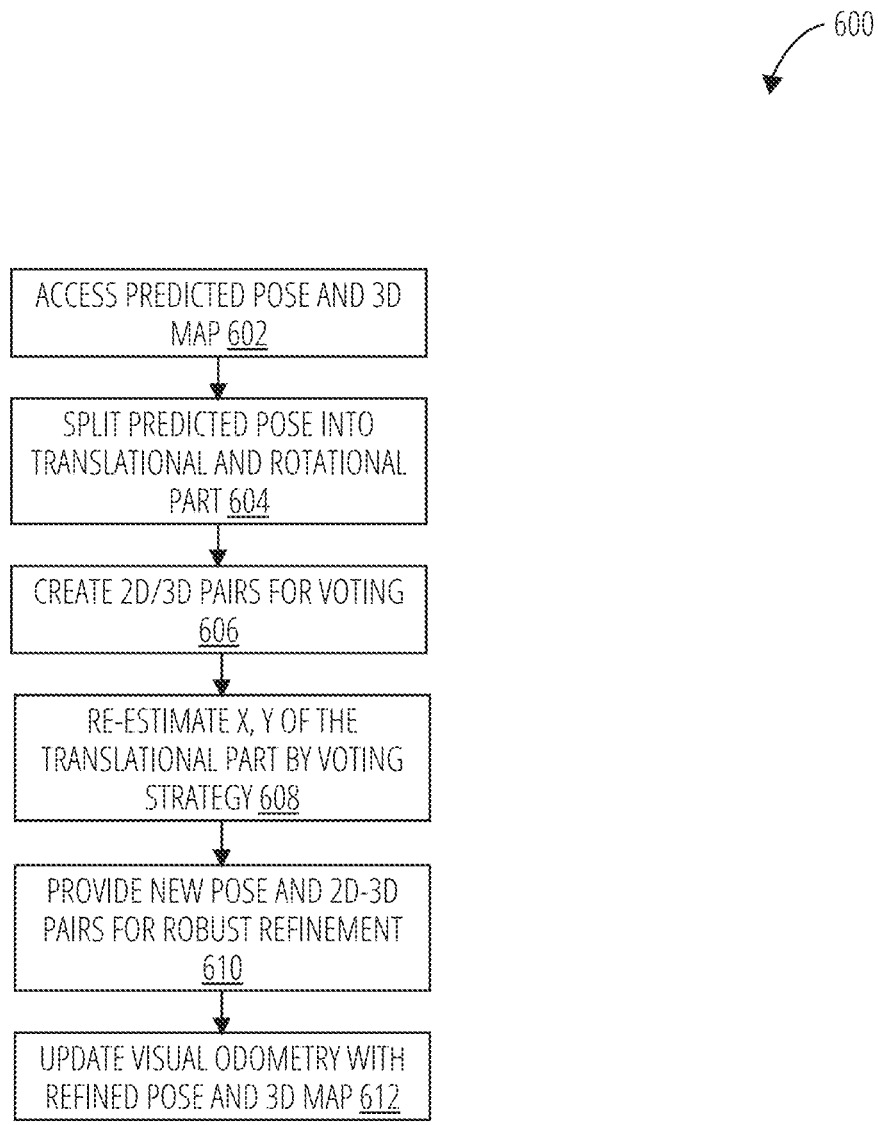
FIG. 6 is a flow diagram illustrating a method for updating visual odometry of an AR display device in accordance with one example embodiment.

FIG. 6 is a flow diagram illustrating a routine 600 for updating visual odometry of an AR display device in accordance with one example embodiment. Operations in the routine 600 may be performed by the visual odometry application 312, using components (e.g., modules, engines) described above with respect to FIG. 4. Accordingly, the routine 600 is described by way of example with reference to the visual odometry application 312. However, it shall be appreciated that at least some of the operations of the routine 600 may be deployed on various other hardware configurations or be performed by similar components residing elsewhere. For example, some of the operations may be performed at the server 110.

In block 602, the visual odometry application 312 accesses predicted pose information and predicted 3D map from the visual odometry system of the AR display device 106. In block 604, the visual odometry application 312 splits the predicted pose into a translational part (x, y, z) and a rotational part (pitch, yaw, roll), where z refers to the gravitational axis. At block 606, 2D/3D pairs are created for voting strategy. In block 608, the visual odometry application 312 re-estimates the x and y components of the translational part by using a voting strategy (e.g., a Hough transform). In block 610, the visual odometry application 312 passes the new pose and 2D/3D correspondences for robust refinement. In block 612, the visual odometry application 312 updates the visual odometry with the refined pose and the 3D map.

Figure 7:
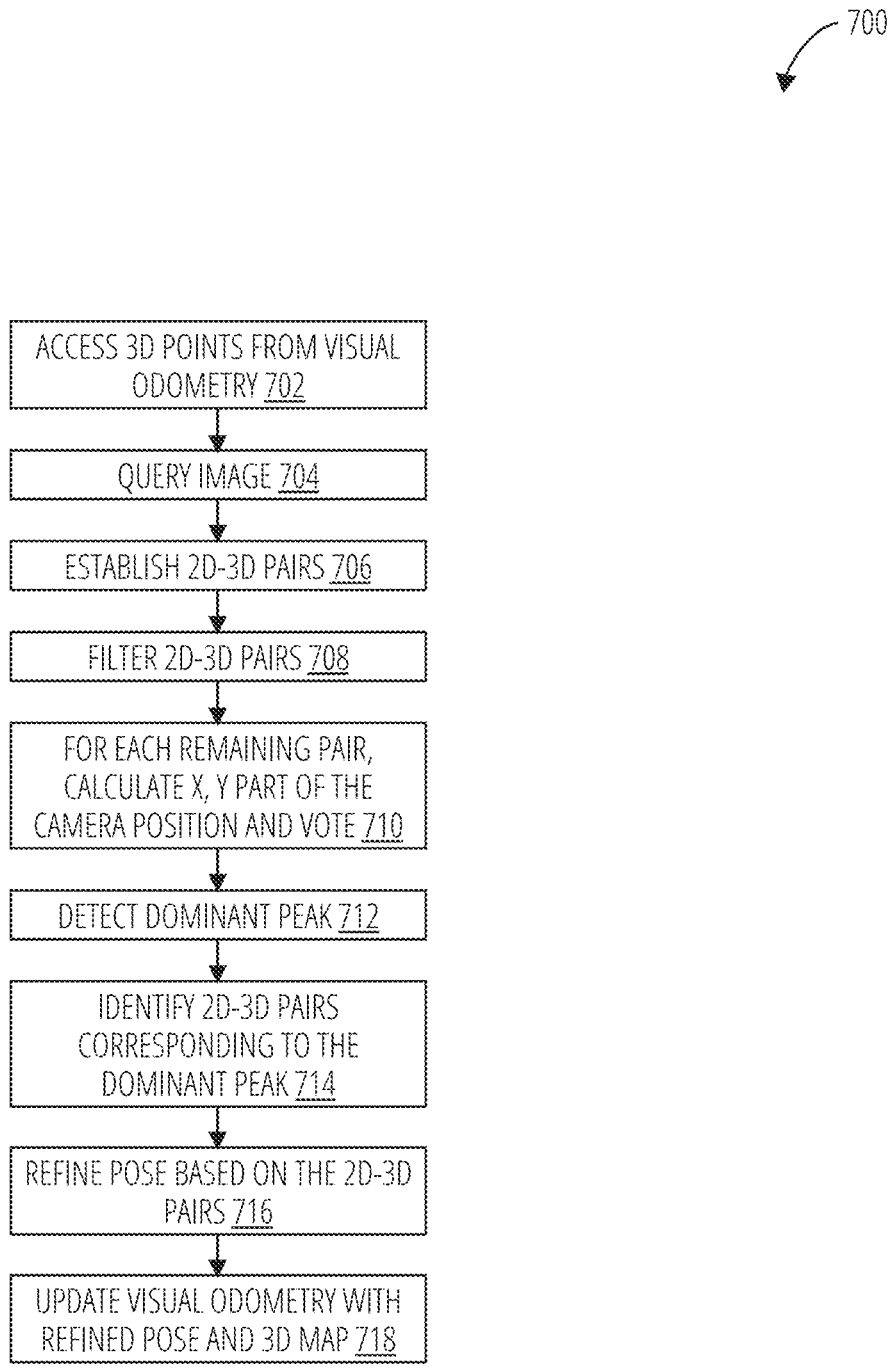
FIG. 7 is a flow diagram illustrating a method for refining a pose estimation of an AR display device in accordance with an example embodiment.

FIG. 7 is a flow diagram illustrating a routine 700 for refining a pose estimation of an AR display device in accordance with an example embodiment. Operations in the routine 700 may be performed by the visual odometry application 312, using components (e.g., modules, engines) described above with respect to FIG. 4. Accordingly, the routine 700 is described by way of example with reference to the visual odometry application 312. However, it shall be appreciated that at least some of the operations of the routine 700 may be deployed on various other hardware configurations or be performed by similar components residing elsewhere. For example, some of the operations may be performed at the server 110.

In block 702, the 3D points module 402 accesses 3D points from the visual odometry system of the AR display device 106. For example, a 3D point X may be represented as:

$$3D \text{ point } X=(X_x, Y_y, X_z)^T$$

The image module 404 accesses an image at the time T from the optical sensor 314. In block 704, the query module 406 queries an image. In block 706, the 2D 3D pair module 408 establishes all 2D/3D pairs based on the queried image. For example, the 2D image feature may be represented as:

$$2D \text{ image feature } u=(u_x, u_y)^T$$

The 2D 3D pair module 408 transforms the 2D image feature u (via known internal camera calibration parameters) to a bearing vector $p=(p_x, p_y, p_z)^T$ The 2D 3D pair module 408 determines the prior 3D point $X_u$ of the point u as the current visual odometry estimate. A point is tracked by the visual odometry system in the image and subsequently reconstructed into X, and included in the overall point cloud. The point is lost from a field of view and newly re-detected when revisiting the same part of the scene. However, there is no knowledge that this point was already seen and already reconstructed. Instead, the visual odometry system reconstructs a new 3D point $X_u$, and since the pose has drifted, the position of $X_u$ also drifts. In one example embodiment, the 2D 3D pair module 408 also determines the prior query camera rotation 3×3 matrix R and center C=(x, y, z)$^T$.

In block 708, the filter module 410 filters 2D/3D pairs based on preset conditions.

In block 710, the voting module 412 calculates the x and y parts of the camera position and votes for each of the remaining pairs. In one example embodiment, the camera height is known, and the prior 3D position of the feature point is used as a soft constraint based on the filter module 410.

The projection equation is represented as:

$$\alpha p = R(X-C)$$

with unknowns: scale α, and coordinates x, y from C;

with knowns: bearing vector p, rotation matrix R, and camera height z (these parts of the 6dof (degrees of freedom) camera pose are least sensitive to drift).

This yields:

$$C=X-\alpha R^T p$$

which is a system of three linear equations with three unknowns. Only one 2D/3D pair is required to solve the equation. The estimated x and y are coordinates provided to the voting accumulator.

In another example embodiment, the camera height is unknown, and the prior 3D position of the feature point is used as a soft constraint based on the filter module 410.

Given X and $X_n$, the camera centers may be defined as:

$$C=X-X_u$$

yielding all three coordinates (x, y, z)$^T$. One can vote for z in the 3D voting space or assume a known height and vote only if the two are in agreement in the 2D voting space.

The above example embodiments illustrate examples to simplify the problem such that only one 2D/3D pair is required to solve the equations.

In block 712, the peak detection module 414 detects a dominant peak based on the x and y parts calculated in block 710. In block 714, the peak detection module 414 identifies the 2D/3D pairs corresponding to the dominant peak. In block 716, the pose estimation module 416 refines the estimated pose of the AR display device 106 based on the 2D/3D pairs identified in block 714. In block 718, the pose estimation module 416 updates the visual odometry application 312 with the refined pose and 3D map.

Figure 8:
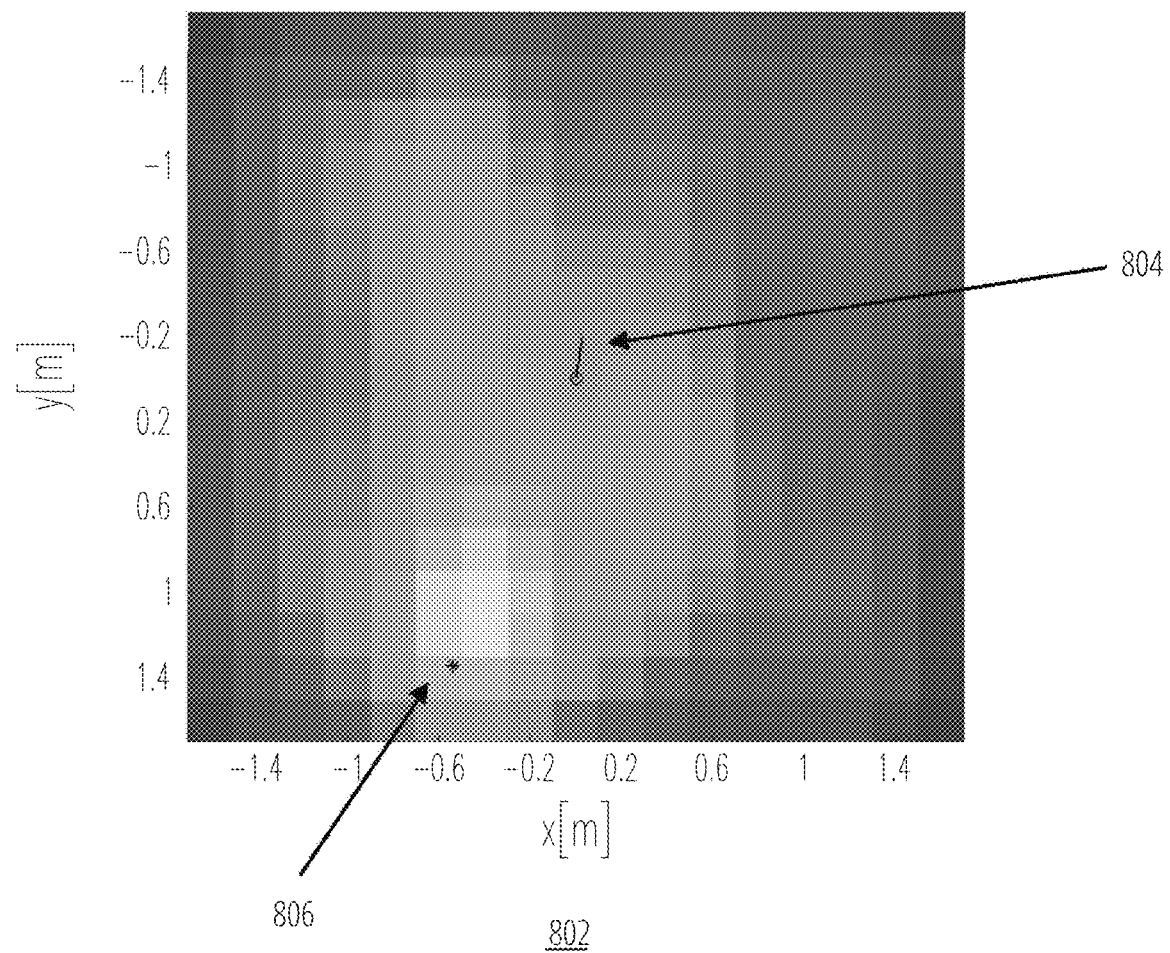
FIG. 8 is a diagram illustrating an example of a voting space in accordance with one example embodiment.

FIG. 8 is a diagram illustrating an example of a voting space 802 in accordance with one example embodiment. The dominant peak is identified, and corresponding 2D/3D pairs are used for pose refinement. An asterisk 806 indicates the refined pose. The estimated pose from the visual odometry system is identified with a line 804. Therefore, the visual odometry system recalibrates to the location corresponding to the asterisk 806.

Figure 9:
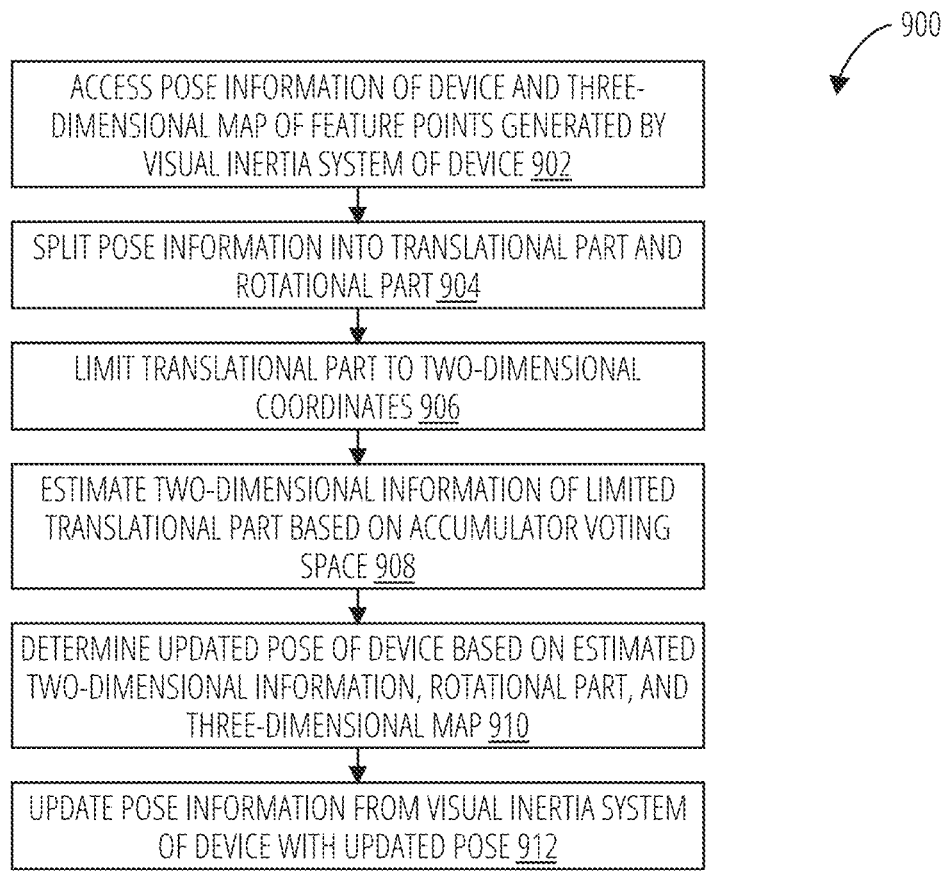
FIG. 9 is a flow diagram illustrating a method for updating pose information of an AR display device in accordance with an example embodiment.

FIG. 9 is a flow diagram illustrating a routine 900 for updating pose information of an AR display device in accordance with an example embodiment. In block 902, the routine 900 accesses pose information of a device and a three-dimensional map of feature points generated by a visual inertia system of the device. In block 904, the routine 900 splits the pose information into a translational part and a rotational part. In block 906, the routine 900 limits the translational part to two-dimensional coordinates. In block 908, the routine 900 estimates two-dimensional information of the limited translational part based on an accumulator voting space. In block 910, the routine 900 determines an updated pose of the device based on the estimated two-dimensional information, the rotational part, and the three-dimensional map. In block 912, the routine 900 updates the pose information from the visual inertia system of the device with the updated pose.

Figure 10:
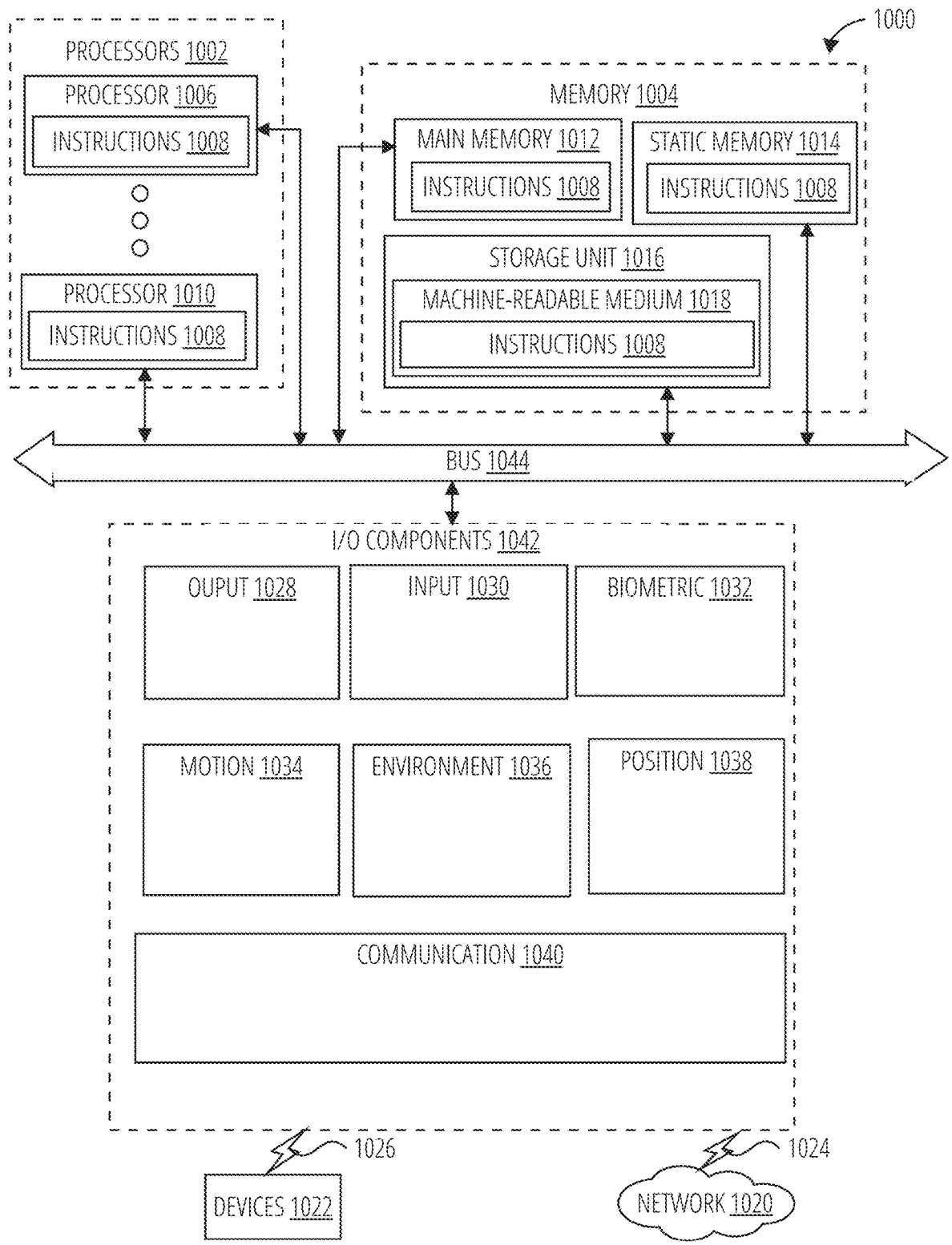
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiple cores, or any combination thereof.

The memory 1004 includes a main memory 1012, a static memory 1014, and a storage unit 1016, each accessible to the processors 1002 via the bus 1044. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or the storage unit 1016 may store one or more sets of instructions and data structures (e.g., software) embodying or used by any one or more of the methodologies or functions described herein. These instructions (e.g., the instructions 1008), when executed by the processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for detecting a loop closure, comprising:
   accessing pose information of a device and a three-dimensional map of feature points generated by a visual inertia system of the device;
   splitting the pose information into a translational part and a rotational part;
   limiting the translational part to two-dimensional coordinates;
   estimating two-dimensional information of the limited translational part based on an accumulator voting space;
   identifying two-dimensional coordinates of a dominant peak based on the estimated two-dimensional information by:
      accessing a current image from a camera of the device,
      identifying feature points based on the current image,
      generating a two-dimensional map of the feature points in the current image,
      accessing a prior three-dimensional map of the feature points,
      accessing prior pose information of the device corresponding to the prior three-dimensional map of the feature points,
      forming pairs of two-dimensional coordinates of the feature points with the prior three-dimensional coordinates of the feature points, the two-dimensional coordinates of the feature points based on the two-dimensional map of the feature points, the prior three-dimensional coordinates of the feature points based on the prior three-dimensional map of the feature points,
      filtering the pairs of the two-dimensional coordinates of the feature points with the prior three-dimensional coordinates of the feature points, and
      for each filtered pair, computing the two-dimensional information;
   determining an updated pose of the device based on the two-dimensional coordinates of the dominant peak, the estimated two-dimensional information, the rotational part, and the three-dimensional map; and
   updating the pose information from the visual inertia system of the device with the updated pose.

2. The method of claim 1, wherein the translational part includes three-dimensional coordinates, wherein the limited translational part does not include a coordinate corresponding to a gravitational axis, wherein the rotational part includes a vertical axis, a transverse axis, and a longitudinal axis.

3. The method of claim 1, wherein the three-dimensional map of feature points does not include image descriptors.

4. The method of claim 1, further comprising:
identifying a drift of the visual inertia system of the device based on the updated pose and the pose information; and
minimizing the drift by updating the virtual inertia system of the device with the updated pose.

5. The method of claim 1, further comprising:
capturing an image of a physical object with the camera of the device;
identifying the physical object based on the three-dimensional map;
retrieving a virtual object based on the identified object; and
displaying the virtual object in a display of the device.

6. The method of claim 1, further comprising:
detecting the loop closure of the device based on the updated pose information from the visual inertia system of the device.

7. A computing apparatus comprising:
a processor; and
a memory storing instructions that, when executed by the processor, configure the apparatus to:
access pose information of a device and a three-dimensional map of feature points generated by a visual inertia system of the device;
split the pose information into a translational part and a rotational part;
limit the translational part to two-dimensional coordinates;
estimate two-dimensional information of the limited translational part based on an accumulator voting space;
identify two-dimensional coordinates of a dominant peak based on the estimated two-dimensional information by:
accessing a current image from a camera of the device,
identifying feature points based on the current image,
generating a two-dimensional map of the feature points in the current image,
accessing a prior three-dimensional map of the feature points,
accessing prior pose information of the device corresponding to the prior three-dimensional map of the feature points,
forming pairs of two-dimensional coordinates of the feature points with the prior three-dimensional coordinates of the feature points, the two-dimensional coordinates of the feature points based on the two-dimensional map of the feature points, the prior three-dimensional coordinates of the feature points based on the prior three-dimensional map of the feature points,
filtering the pairs of the two-dimensional coordinates of the feature points with the prior three-dimensional coordinates of the feature points, and
for each filtered pair, computing the two-dimensional information;
determine an updated pose of the device based on the two-dimensional coordinates of the dominant peak, the estimated two-dimensional information, the rotational part, and the three-dimensional map; and
update the pose information from the visual inertia system of the device with the updated pose.

8. The computing apparatus of claim 7, wherein the translational part includes three-dimensional coordinates, wherein the limited translational part does not include a coordinate corresponding to a gravitational axis, wherein the rotational part includes a vertical axis, a transverse axis, and a longitudinal axis.

9. The computing apparatus of claim 7, wherein the three-dimensional map of feature points does not include image descriptors.

10. The computing apparatus of claim 7, wherein the instructions further configure the apparatus to:
identify a drift of the visual inertia system of the device based on the updated pose and the pose information; and
minimize the drift by updating the virtual inertia system of the device with the updated pose.

11. The computing apparatus of claim 7, wherein the instructions further configure the apparatus to:
capture an image of a physical object with the camera of the device:
identify the physical object based on the three-dimensional map;
retrieve a virtual object based on the identified object; and
display the virtual object in a display of the device.

12. A non-transitory computer-readable storage medium, the computer-readable storage medium including instructions that when executed by a computer, cause the computer to:
access pose information of a device and a three-dimensional map of feature points generated by a visual inertia system of the device;
split the pose information into a translational part and a rotational part;
limit the translational part to two-dimensional coordinates;
estimate two-dimensional information of the limited translational part based on an accumulator voting space;
identify two-dimensional coordinates of a dominant peak based on the estimated two-dimensional information by:
accessing a current image from a camera of the device,
identifying feature points based on the current image,
generating a two-dimensional map of the feature points in the current image,
accessing a prior three-dimensional map of the feature points,
accessing prior pose information of the device corresponding to the prior three-dimensional map of the feature points,
forming pairs of two-dimensional coordinates of the feature points with the prior three-dimensional coordinates of the feature points, the two-dimensional coordinates of the feature points based on the two-dimensional map of the feature points, the prior three-dimensional coordinates of the feature points based on the prior three-dimensional map of the feature points,
filtering the pairs of the two-dimensional coordinates of the feature points with the prior three-dimensional coordinates of the feature points, and
for each filtered pair, computing the two-dimensional information;
determine an updated pose of the device based on the two-dimensional coordinates of the dominant peak, the estimated two-dimensional information, the rotational part, and the three-dimensional map; and update the pose information from the visual inertia system of the device with the updated pose.

\* \* \* \* \*

UNITED STATES PATENT AND TRADEMARK OFFICE
CERTIFICATE OF CORRECTION

PATENT NO. : 11,450,022 B2
APPLICATION NO. : 17/081093
DATED : September 20, 2022
INVENTOR(S) : Branislav Micusik It is certified that error appears in the above-identified patent and that said Letters Patent is hereby corrected as shown below:

In the Claims

In Column 18, Line 22, in Claim 11, delete "device:" and insert --device;-- therefor Signed and Sealed this
Twentieth Day of December, 2022

Katherine Kelly Vidal
*Director of the United States Patent and Trademark Office*